(12) United States Patent
Araki et al.

(10) Patent No.: US 6,302,484 B1
(45) Date of Patent: Oct. 16, 2001

(54) APPARATUS FOR PERMITTING PASS-THROUGH BETWEEN VEHICLE COMPARTMENT AND TRUNK ROOM

(75) Inventors: Toyohiro Araki; Kazuya Miwa, both of Okazaki; Norifumi Mikami, Nagoya, all of (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 09/332,608

(22) Filed: Jun. 14, 1999

(30) Foreign Application Priority Data

Jun. 12, 1998 (JP) .................................................. 10-164764

(51) Int. Cl.[7] ........................................................ B60N 2/48
(52) U.S. Cl. ................................ 297/378.12; 296/65.09; 296/65.16; 297/112; 297/238
(58) Field of Search .............................. 297/378.12, 238, 297/112, 113; 296/65.16, 65.09

(56) References Cited

U.S. PATENT DOCUMENTS

| | | | |
|---|---|---|---|
| 5,106,158 | * | 4/1992 | Dukatz et al. .................... 297/112 X |
| 5,366,270 | * | 11/1994 | Heussner et al. .................... 297/238 |
| 5,527,093 | * | 6/1996 | Park ...................................... 297/238 |
| 5,540,479 | * | 7/1996 | Thomas et al. ....................... 297/113 |
| 5,700,054 | * | 12/1997 | Lang ..................................... 297/238 |

FOREIGN PATENT DOCUMENTS

| | | |
|---|---|---|
| 64-37740 | 3/1989 | (JP) . |
| 1-102033 | 7/1989 | (JP) . |

* cited by examiner

*Primary Examiner*—Peter R. Brown
*Assistant Examiner*—Stephen Vu
(74) *Attorney, Agent, or Firm*—Rossi & Associates

(57) ABSTRACT

In an apparatus for permitting pass-through between a vehicle compartment and a trunk room of a motor vehicle, a first hook is provided on a forward foldable portion of a seat back of the rear seat, and a second hook that is engageable with the first hook is provided on the seat back. The first and second hooks are normally biased by coil springs in such a direction as to engage these hooks with each other. A vehicle-compartment-side strap and a trunk-room-side strap are provided for rotating the first hook and the second hook, respectively, so as to release the engagement of these hooks. A lock device is also provided for limiting rotation of the first hook while the forward foldable portion is in the upright portion, thus making it impossible to release the engagement of the first hook with the second hook by pulling the vehicle-compartment-side strap.

15 Claims, 7 Drawing Sheets

APPARATUS FOR PERMITTING PASS-THROUGH BETWEEN VEHICLE COMPARTMENT AND TRUNK ROOM

FIELD OF THE INVENTION

The present invention relates to an apparatus disposed between a vehicle compartment and a trunk room of an automobile, for permitting pass-through between the vehicle compartment and trunk room.

BACKGROUND OF THE INVENTION

In recent years, an increasing number of passenger cars, such as sedans, are equipped with such apparatuses that permit a part of a seat back of the vehicle rear seat to be reclined forward or folded down on its seat cushion, to provide extended cargo room. More specifically, the seat back includes a forward foldable portion which can be reclined from the upright position to the folded position in which the vehicle compartment and the trunk room communicate with each other, to enable one in the vehicle compartment to put cargo into or take it out of the trunk room.

In the above apparatus, the forward foldable portion is allowed to lean forward to the folded position relative to the rest of the seat back. The apparatus is also provided with a lock device for locking or holding the forward foldable portion in the upright position. By releasing the lock device from the side of the vehicle compartment or trunk room, the forward foldable portion can be reclined forward or folded down on the seat cushion, so that the vehicle compartment communicates with the trunk room. In the known apparatus, however, the lock device can be normally released from only one side of the vehicle compartment and the trunk room, which is inconvenient when one wishes to release the lock device from the other side. Thus, it has been desired to enable the lock device to be released from both sides of the vehicle compartment and the trunk room.

In view of the above problem, there have been proposed rear seat structures of so-called trunk-through type, as disclosed in Japanese Utility Model Publications No. 64-37740 and No. 1-102033.

With regard to the seat structure as disclosed in Japanese Utility Model Publication No. 64-37740, a recessed portion is formed in the side face of the base portion of the seat back, so as to extend through the seat back to the front and back thereof, and an operating lever for reclining the seat back forward to the folded position is provided in the recessed portion such that the lever can be operated from the front and back sides of the seat back. With this arrangement, the seat back can be reclined forward to the folded position, or held in the upright position.

With regard to the seat structure as disclosed in Japanese Utility Model Publication No. 1-102033, a lock device is provided for causing an engaging member on the side of the seat back to engage with an engaging member on the side of the vehicle body, so as to prevent the seat back from leaning forward, and an operating mechanism is provided for moving the engaging member of the seat back in the direction opposite to the engaging direction, so as to allow the seat back to be reclined forward to the folded position. Also, a stopper mechanism that is engageable with the operating mechanism is provided for inhibiting the operating mechanism from moving the engaging member of the seat back in the releasing direction, and one on the side of the trunk room is able to operate the stopper mechanism for engagement with or release from the operating mechanism. Furthermore, a release mechanism is provided for moving the operating mechanism in the direction for releasing the engagement of the engaging member on the side of the seat back with the engaging member on the side of the vehicle body when the stopper mechanism and operating mechanism are placed in the released state.

In the seat structure as disclosed in Japanese Utility Model Publication No. 64-37740 as described above, the recessed portion is formed in the side face of the base portion of the seat back so as to extend through the seat back to the front and back thereof, and the operating lever mounted in the recessed portion may be operated from both sides of the vehicle compartment and trunk room, so that the seat back can be reclined forward to the folded position. In this arrangement, however, the operating lever mounted in the recessed portion formed in the seat back is always exposed to the vehicle compartment and trunk room, and thus deteriorates the appearance of the seat. Also, the rear seat structure is generally provided with a theft proof lock device that makes it impossible to operate the operating lever from the side of the vehicle compartment, thus permitting the operating lever to be operated only from the side of the trunk room. In the seat structure as disclosed in this publication, however, such a theft proof lock device cannot be installed.

In the seat structure as disclosed in Japanese Utility Model Publication No. 1-102033 as described above, the lock device is released by operating the operating mechanism from the inside of the vehicle compartment, so as to permit the seat back to be reclined forward to the folded position, while the stopper mechanism is engaged with or released from the operating mechanism by operating the releasing mechanism from the inside of the trunk room, thus permitting the seat back to be reclined forward to the folded position through the operating mechanism when it is released from the stopper mechanism. Thus, the seat back can be reclined forward to the folded position by operating the operating mechanism from both sides of the vehicle compartment and the trunk room, and the stopper mechanism serves as a theftproof lock device. In the presence of the theft proof lock device, however, the operating mechanism, stopper mechanism, and the releasing mechanism must be appropriately associated or linked with each other, which results in a complicated structure and increased cost for components.

SUMMARY OF THE INVENTION

To solve the above problems, it is an object of the present invention to provide an apparatus for permitting pass-through between a vehicle compartment and a trunk room of an automobile, which can be operated from both sides of the vehicle compartment and the trunk room for the sake of improved convenience, and which has a simplified structure while assuring improved safety.

According to the present invention, an apparatus for permitting pass-through between a vehicle compartment and a trunk room is provided which comprises: a closure member provided at a boundary between a vehicle compartment and a trunk room, such that the closure member is pivotably supported by a support member provided on the side of a vehicle body, and such that the closure member being selectively placed in an open position for permitting communication between the vehicle compartment and the trunk room, and a closed position in which the closure member separates the vehicle compartment from the trunk room; a first hook that is movably supported by the closure member;

a second hook that is movably supported by the closure member, the second hook being engageable with the first hook when the closure member is placed in the closed position; a biasing member that exerts a bias force to the first hook and the second hook in such a direction as to engage the first and second hooks with each other; a vehicle-compartment-side operating member provided on the side of the vehicle compartment and operable to move one of the first hook and second hook against the bias force of the biasing member, thereby to release engagement of the first hook with the second hook; a trunk-room-side operating member provided on the side of the trunk room and operable to move the other of the first hook and second hook against the bias force of the biasing member, thereby to release engagement of the first hook with the second hook; and a lock member provided on the side of the trunk room and operable to limit displacement of the above-indicated one of the first hook and the second hook that would be moved by operating the vehicle-compartment-side operating member, so as to make it impossible to release engagement of the first hook with the second hook from the side of the vehicle compartment.

In the apparatus constructed as described above, while the closure member is held in the closed position due to engagement of the first hook with the second hook, the vehicle-compartment-side operating member may be operated from the side of the vehicle compartment, or the trunk-room-side operating member may be operated from the side of the trunk room, so as to release the engagement of the first and second hooks, namely, disengage the first and second hooks from each other. Thus, the closure member can be brought into the open position from the vehicle compartment side and from the trunk room side, assuring improved convenience or handling ease. Also, the apparatus of the invention has a simplified structure. When the closure member is placed in the closed position, the lock member is operable to limit rotation of the hook that would be otherwise rotated by the vehicle-compartment-side operating member, to permit the closure member to be brought into the open position only from the side of the trunk room, thus assuring improved safety.

BRIEF DESCRIPTION OF THE DRAWINGS

The invention will be described in greater detail with reference to a preferred embodiment thereof and the accompanying drawings, wherein.

DETAILED DESCRIPTION OF THE PREFERRED EMBODIMENT

Figure 1:
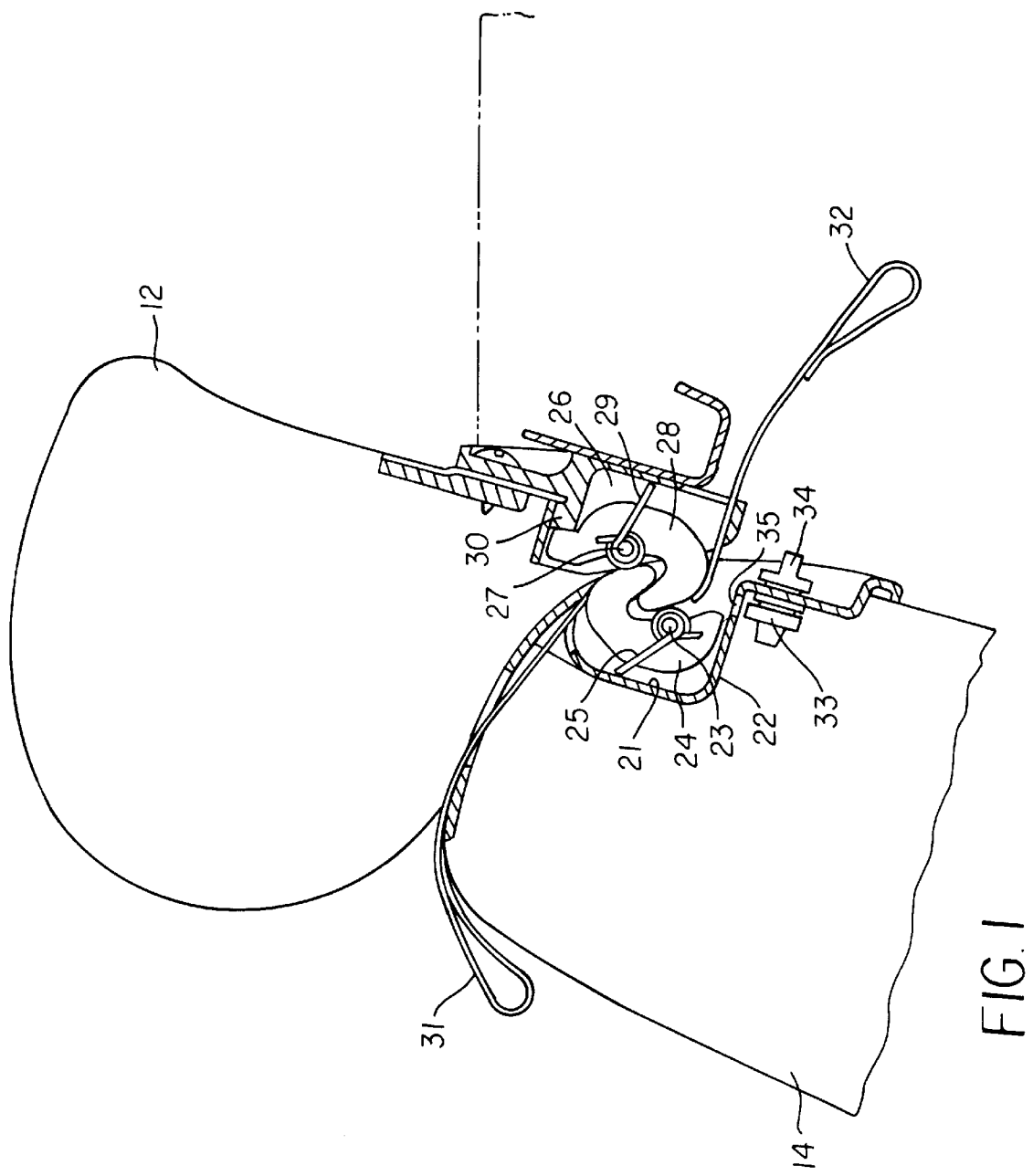
FIG. 1 is a schematic view showing an apparatus for permitting pass-through between a vehicle compartment and a trunk room according to one embodiment of the present invention, which apparatus is installed on a rear seat of an automobile.

Referring to the drawings, one preferred embodiment of the present invention will be described in detail.

Figure 2:
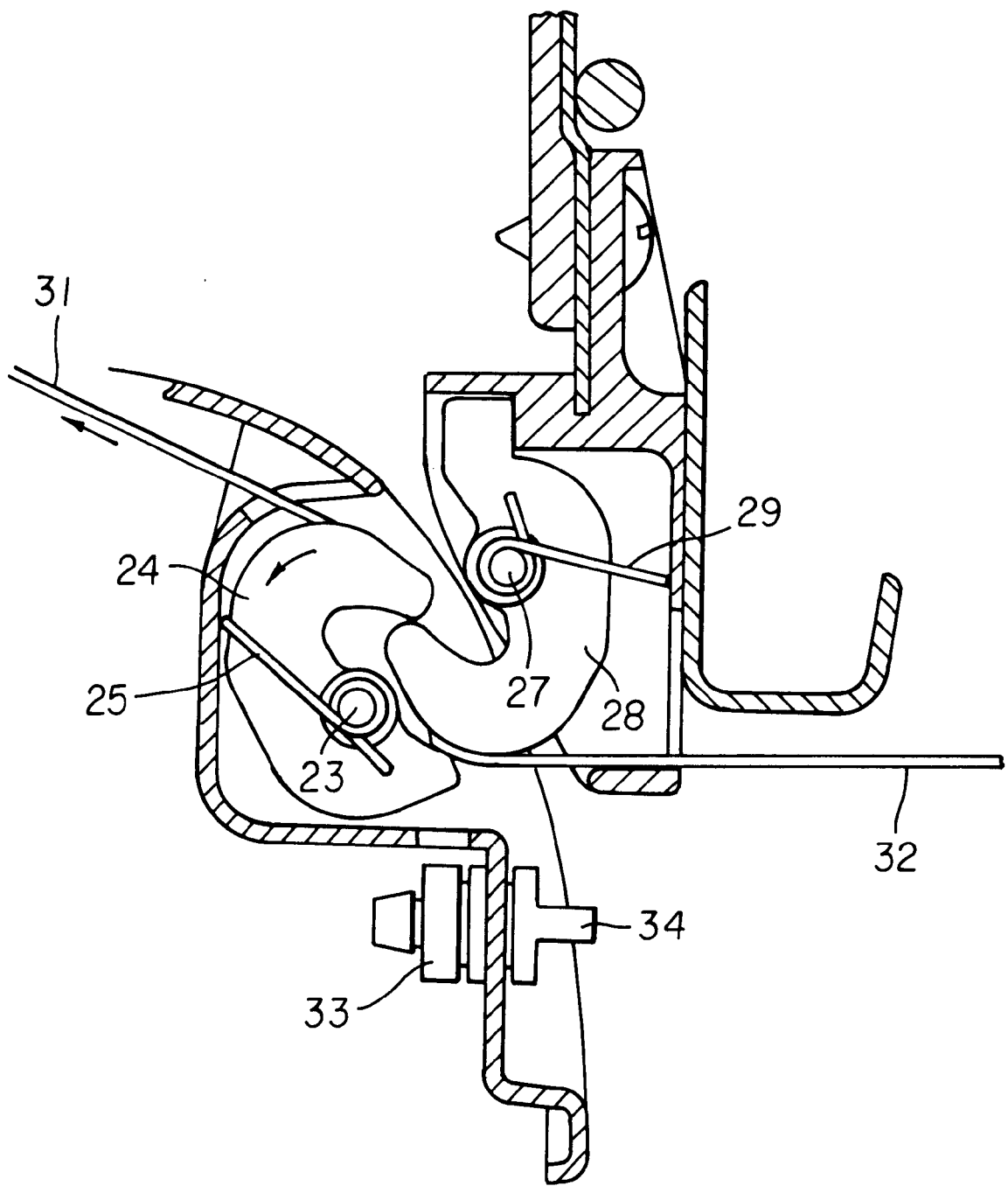
FIG. 2 is a cross-sectional view of a principal part of the apparatus of FIG. 1 when it is being operated from the side of the vehicle compartment.
Figure 3:
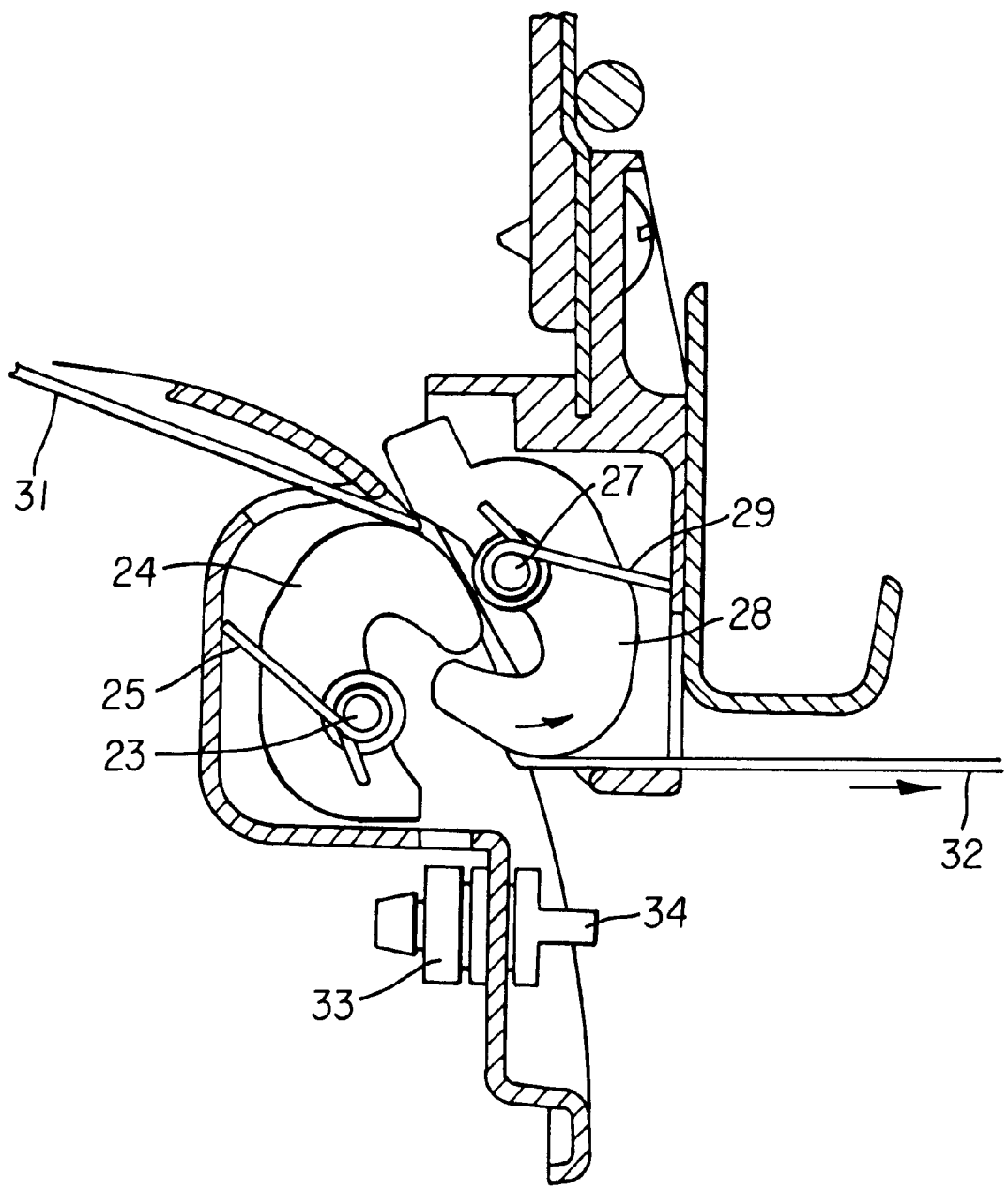
FIG. 3 is a cross-sectional view of the principal part of the apparatus of FIG. 1 when it is operated from the side of a trunk room of the vehicle.
Figure 4:
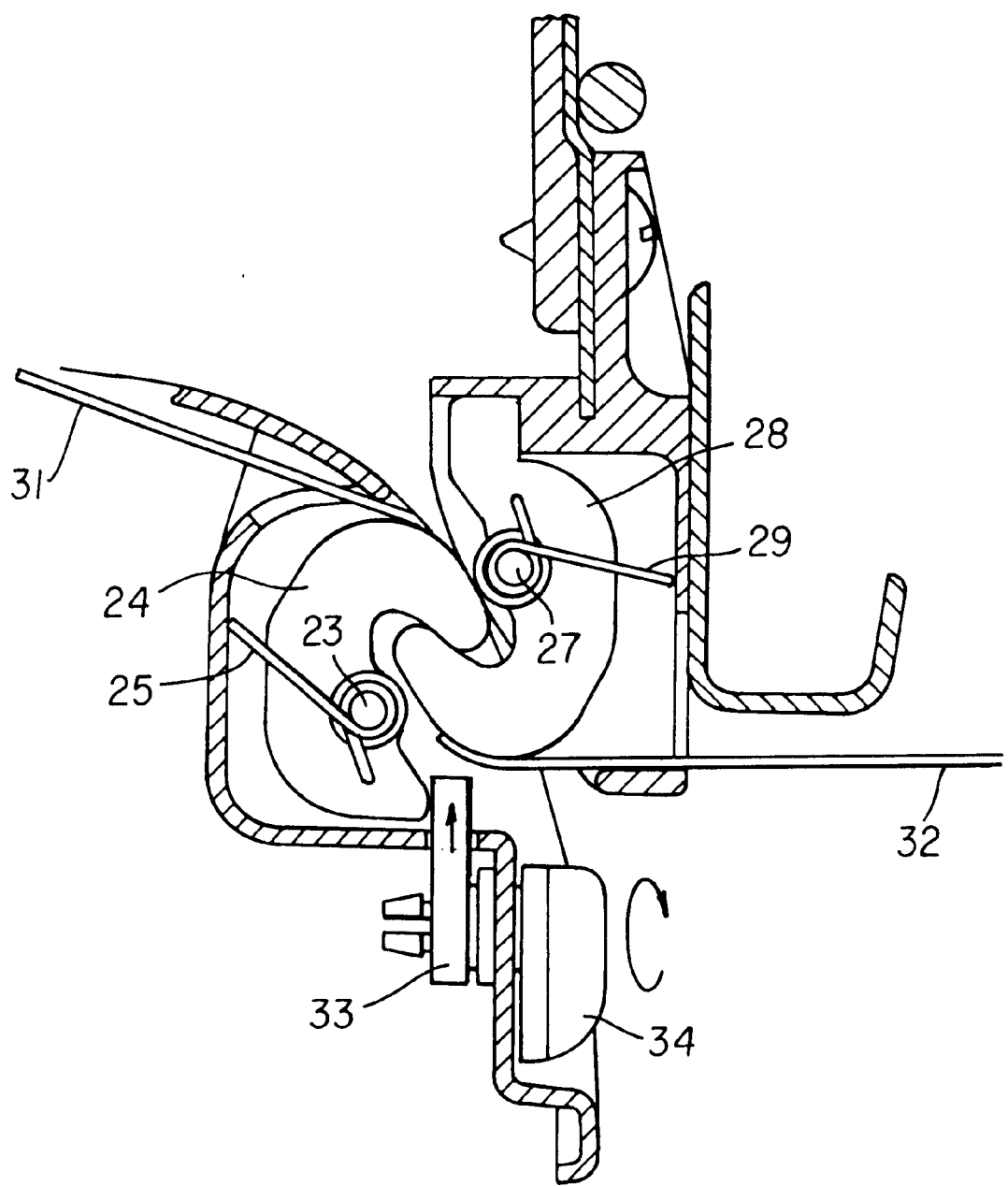
FIG. 4 is a cross-sectional view showing the principal part of the apparatus of FIG. 1 when it is placed in the locked position for protecting the automobile against theft.

FIG. 1 is a schematic view showing an apparatus for permitting pass-through between a vehicle compartment and a trunk room according to one embodiment of the present invention, which apparatus is installed on a rear seat of an automobile, and FIG. 2 is a cross-sectional view of a principal part of the apparatus of FIG. 1 when it is being operated from the side of the vehicle compartment, while FIG. 3 is a cross-sectional view of the principal part of the apparatus of FIG. 1 when it is operated from the side of the trunk room or cargo room of the vehicle. FIG. 4 is a cross-sectional view showing the principal part of the apparatus of FIG. 1 when it is placed in the locked position for protecting the automobile against theft, and FIG. 5 is a perspective view showing the vehicle rear seat on which the apparatus of FIG. 1 is installed.

Figure 5A:
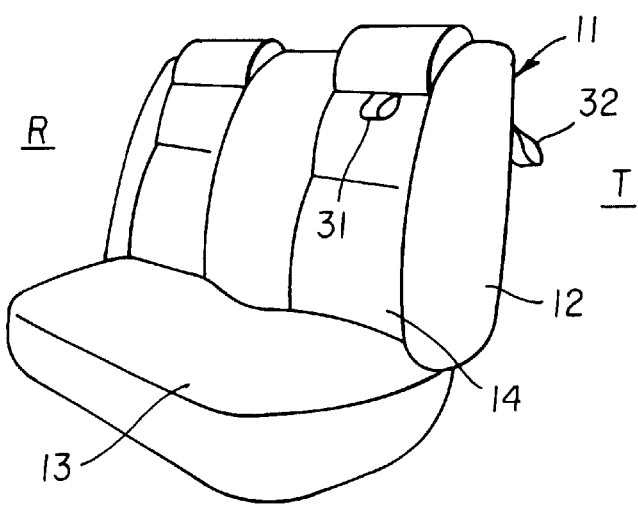
FIG. 5 is a perspective view showing the vehicle rear seat on which the apparatus of FIG. 1 is installed.
Figure 5B:
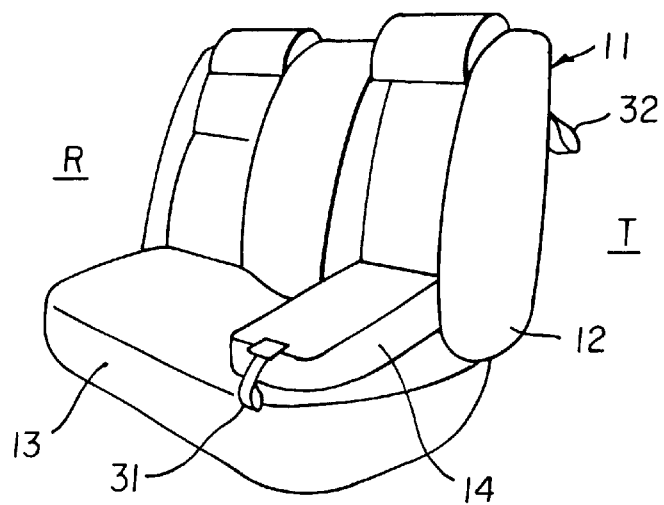

Referring first to FIG. 5(a), the vehicle rear seat 11 principally consists of a seat back 12 and a seat cushion 13, and the seat back 12 includes a forward foldable portion 14 formed as a part thereof. As shown in FIG. 5(b), the forward foldable portion 14 may be reclined forward or folded about a pivot provided at its lower part, to provide a flat cargo floor extension, so that the vehicle compartment R and the trunk room T communicate with each other through an opening that was occupied by the forward foldable portion 14. Also, a lock device is provided at the upper part of the forward foldable portion 14, for holding the foldable portion 14 in its upright position.

More specifically described referring to FIG. 1, a generally V-shaped recess 21 is formed in the upper, rear face of the forward foldable portion 14 of the seat back 12, and a mounting bracket 22 is fixedly fitted in the recess 21. A first hook 24 is rotatably attached to the mounting bracket 22 by means of a support shaft 23. The first hook 24 is biased by a coil spring 25 as biasing means in the clockwise direction as seen in FIG. 1, and held by a stopper (not shown) in the position as shown in FIG. 1. On the other hand, a mounting bracket 26 is fixed to the upper rear face of the seat back 12, and a second hook 28 is rotatably attached to the mounting bracket 26 by means of a support shaft 27. The second hook 28 is biased by a coil spring 29 as biasing means in the clockwise direction as seen in FIG. 1, and held by a stopper 30 in the position as shown in FIG. 1. The first and second hooks 24, 28 engage with each other when the forward foldable portion 14 is held in the upright position, so as to engage the forward foldable portion 14 with the seat back 12 to thus keep the same in the upright position.

A vehicle-compartment-side strap 31 as an operating member on the side of the vehicle compartment has a proximal end portion that is connected to the first hook 14, and a distal end portion that is exposed to the vehicle compartment R. When the strap 31 is pulled toward the vehicle compartment R, the first hook 24 is rotated counterclockwise as viewed in FIG. 1 against the bias force of the coil spring 25, and disengaged from the second hook 28, so that the forward foldable portion 14 can be reclined forward or folded onto the seat cushion 13. A trunk-room-side strap 32 as an operating member on the side of the trunk room has a proximal end portion that is connected to the second hook 28, and a distal end portion that is exposed to the trunk room T. When the strap 32 is pulled toward the trunk room T, the second hook 28 is rotated counterclockwise as viewed in FIG. 1 against the bias force of the coil spring 29, and disengaged from the first hook 24, so that the forward foldable portion 14 can be reclined forward or folded onto the seat cushion 13.

A lock piece 33 is rotatably attached to the lower part of the mounting bracket 22, such that the lock piece 33 can be freely rotated by an operating member 34 that is exposed to the trunk room T. By rotating the lock piece 33 with the operating member 34, the distal end portion of the lock piece 33 protrudes upward through a through-hole 35 of the mounting bracket 22, so as to engage with the first hook 24 and inhibit rotation of the first hook 24. When the forward foldable portion 14 is held in the upright position, therefore, the operating member 34 may be operated to rotate the lock piece 33 so as to bring its distal end portion into engagement with the first hook 24, so that the first hook 24 is prevented from being rotated counterclockwise as seen in FIG. 1, and disengaged or released from the second hook 28 from the side of the vehicle compartment R.

In the apparatus of the present embodiment constructed as described above, when the forward foldable portion 14 is in the upright position as shown in FIG. 1, the first hook 24 and the second hook 28 are held in engagement with each other such that the forward foldable portion 14 is retained in the upright position for engagement with the seat back 12. If the vehicle-compartment-side strap 31 is pulled toward the vehicle compartment R while the forward foldable portion 14 is in the upright position, the first hook 24 is rotated against the bias force of the coil spring 34 and disengaged or released from the second hook 28, as shown in FIG. 2, so that the forward foldable portion 14 leans forward and lies down on the seat cushion 13. In this state, the vehicle compartment R and the trunk room T communicate with each other through an opening previously occupied by the foldable portion 14, thus enabling one in the vehicle compartment to put cargo into or take it out of the trunk room T.

If the trunk-room-side strap 32 is pulled toward the trunk room T while the forward foldable portion 14 is in the upright position, the second hook 28 is rotated against the bias force of the coil spring 29 and disengaged or released from the first hook 24, as shown in FIG. 3, so that the forward foldable portion 14 is able to lean forward and lie down onto the seat cushion 13. In this state, the vehicle compartment R and the trunk room T communicate with each other through an opening previously occupied by the foldable portion 14, thus enabling one in the vehicle compartment to put cargo into or take it out of the trunk room T.

When the operating member 34 is manipulated or operated to rotate the lock piece 33 so as to bring its distal portion into engagement with the first hook 24, as shown in FIG. 4, while the first hook 24 and second hook 28 are in engagement with each other and the forward foldable portion 14 is in the upright position, the lock piece 33 prevents the first hook 24 from being rotated in such a direction as to release its engagement with the second hook 28. If the vehicle-compartment-side strap 31 is pulled toward the vehicle compartment R in this state of FIG. 4 with the forward foldable portion 14 being in the upright position, the first hook 24 will not rotate, and cannot be disengaged from the second hook 28. Thus, the forward foldable portion 14 is prevented from being reclined forward or folded, making it impossible to access the trunk room T from the vehicle compartment R for entry or removal of cargo.

The operating member 34 for rotating the lock piece 33 is provided on the rear face of the forward foldable portion 14 of the seat back 12. With this arrangement, the operating member 34 may be operated to rotate the lock piece 33 to bring its distal portion into engagement with the first hook 24 while the forward foldable portion 14 is in the folded position, and then the forward foldable portion 14 may be raised to its upright position, so that the first hook 24 engages with the second hook 28 through rotation of the second hook 28, and the forward foldable portion 14 is held in the upright position. In this state, the forward foldable portion 14 is prevented from leaning forward even if the vehicle-compartment-side strap 31 is pulled toward the vehicle compartment R. This arrangement eliminates the need to go around to the side of he trunk room T to operate the operating member 34 for placing the apparatus in the locked position, as in the conventional apparatus.

Figure 6:
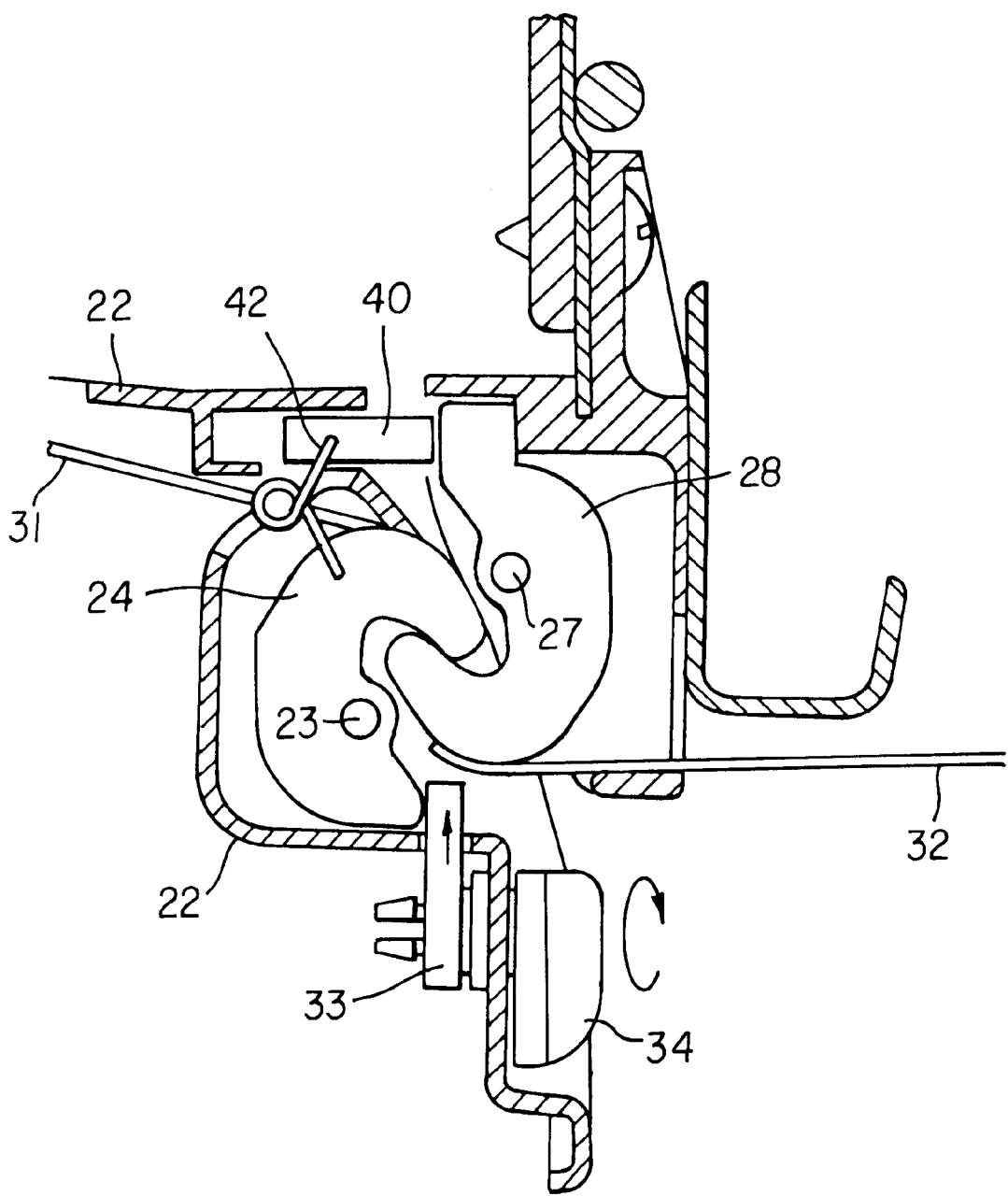
FIG. 6 is a cross-sectional view of a principal part of another embodiment of the present invention that uses only one spring.
Figure 7:
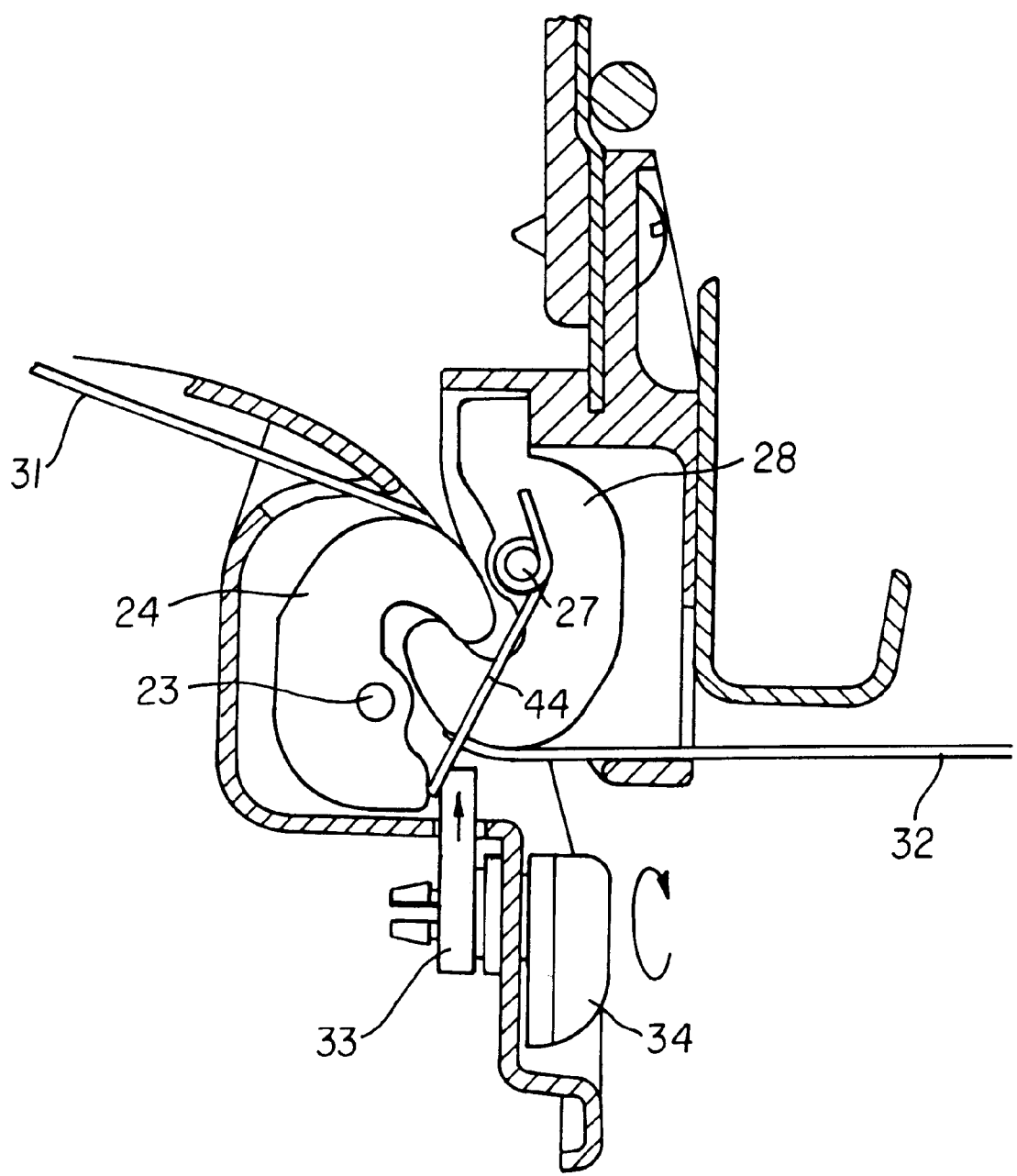
FIG. 7 is a cross-sectional view of a principal part of additional embodiment of the present invention that uses only one spring.

While two coil springs 25, 29 are provided as means for biasing the first hook 24 and the second hook 28 in the engaging directions in the illustrated embodiment, only one spring may be used for biasing the first and second hooks 24, 28. FIG. 6 to FIG. 7 shows such embodiments that use only one spring.

In the embodiment shown in FIG. 6, slider 40 and a coil spring 42 are provided instead of two coil springs 25, 29. The slider 40 is slidably attached to the mounting bracket 22 so that the slider 40 can abut to the upper end of the second hook 28 when the foldable portion 14 is held in the upright position. One end of the coil spring 42 is connected to the first hook 24 and the other end is connected to the slider 40 so that the spring 42 biases the first hook 24 in the clockwise direction and the second hook 28 via the slider 40 in the clock wise direction in FIG. 6 when the forward foldable portion 14 is held in the upright position. Thus, the first and second hook 24, 28 engage with each other when the foldable portion 14 is held in the upright position. While the slider 40 and the coil spring 42 are arranged at the fordable portion 14 side in FIG. 6, it is possible to arrange the slider 40 and the coil spring 42 at the seat back 12 side. In such arrangement, one end of the coil spring is connected to the second hook 28 and the other end is connected to the slider so that the coil spring biases the second hook 28 in the clockwise direction and the first hook 24 via the slider in the clock wise direction in FIG. 6 when the forward foldable portion 14 is held in the upright position.

In the embodiment shown in FIG. 7, a coil spring 44 is provided instead of two coil springs 25, 29. One end of the coil spring 44. is connected to the second hook 28 and the other end can abut the lower end of the first hook 24 so that the coil spring 44 biases the first and second hook 24, 28 in the clockwise direction, respectively when the forward foldable portion 14 is held in the upright position. Thus, the first and second hook 24, 28 engage with each other when the foldable portion 14 is held in the upright position. While the coil spring 44 is arranged at the seat back 12 side, it is possible to arrange the coil spring 44 at the forward fordable portion 14. In such arrangement, one end of the coil spring is connected to the first hook 24 and the other end can abut the upper end of the second hook 28 so that the coil spring biases the first hook and second hook 24, 28, respectively when the forward foldable portion 14 is held in the upright position.

Also, the compartment-side strap 31 and the trunk-room-side strap 32 provided as the operating members on the side of the vehicle compartment and the trunk room, respectively, may be replaced by operating levers that are coupled to the first hook 24 and the second hook 28, respectively.

In the illustrated embodiment, the vehicle-compartment-side strap 31 is connected to the first hook 24, and the trunk-room-side strap 32 is connected to the second hook 28.

It is, however, possible to connect the vehicle-compartment-side strap 31 to the second hook 28, and connect the trunk-room-side strap 32 to the first hook 24.

While the closure member is provided by the forward foldable portion 14 as a part of the seat back 12 in the illustrated embodiment, the present invention may be applied to a rear seat structure in which the seat back 12 as a whole can be reclined forward to a folded cargo configuration, and is thus regarded as the closure member.

What is claimed is:

1. An apparatus for permitting pass-through between a vehicle compartment and a trunk room of a motor vehicle, comprising:
   a closure member provided at a boundary between the vehicle compartment and the trunk room, such that the closure member is pivotably supported by a support member provided on the side of a vehicle body, said closure member being selectively placed in an open position for permitting communication between the vehicle compartment and the trunk room, and a closed position in which the closure member separates the vehicle compartment from the trunk room;
   a first hook that is movably supported by said closure member;
   a second hook that is movably supported by said closure member, said second hook being engageable with said first hook when said closure member is placed in the closed position;
   a biasing member that exerts a bias force to said first hook and said second hook in such a direction as to engage the first and second hooks with each other;
   a vehicle-compartment-side operating member provided on the side of the vehicle compartment and operable to move one of said first hook and said second hook against the bias force of said biasing member, thereby to release engagement of the first hook with the second hook;
   a trunk-room-side operating member provided on the side of the trunk room and operable to move the other of said first hook and said second hook against the bias force of said biasing member, thereby to release engagement of the first hook with the second hook; and
   a lock member provided on the side of the trunk room and operable limit displacement of said one of said first hook and said second hook that would be moved by operating said vehicle-compartment-side operating member, so as to make it impossible to release engagement of the first hook with the second hook from the side of the vehicle compartment.

2. The apparatus according to claim 1, wherein said closure member comprises a seat back of a rear seat of the motor vehicle.

3. The apparatus according to claim 1, wherein said closure member comprises a part of a seat back of a rear seat of the motor vehicle.

4. The apparatus according to claim 3, wherein said support member comprises a part of said rear seat.

5. The apparatus according to claim 1, wherein said vehicle-compartment-side operating member is connected to one of the first hook and the second hook, and said trunk-room-side operating member is connected to the other of the first hook and the second hook, and wherein said lock member limits displacement of said one of the first hook and the second hook, to make it impossible to release engagement of the first hook with the second hook from the side of the vehicle compartment.

6. The apparatus according to claim 5, wherein said vehicle-compartment-side operating member is connected to said first hook, and said trunk-room-side operating member is connected to said second hook, and wherein said lock member limits displacement of said first hook, to make it impossible to release engagement of the first hook with the second hook from the side of the vehicle compartment.

7. The apparatus according to claim 6, wherein said closure member is supported at a lower end portion thereof by said support member, and wherein said first hook is disengaged from said second hook by pulling said vehicle-compartment-side operating member toward the vehicle compartment.

8. The apparatus according to claim 7, wherein said closure member is able to close an opening formed through a seat back of a rear seat of the motor vehicle, and said vehicle-compartment-side operating member comprises a strap having one end that is connected to said first hook, and the other end that is located within the vehicle compartment.

9. The apparatus according to claim 7, wherein said lock member is located at an upper end portion of said closure member such that the lock member can be operated only from the side of the trunk room when the closure member is in the closed position.

10. The apparatus according to claim 9, wherein said first hook is provided in said closure member, and said lock member is provided on one side of said closure member that faces the trunk room.

11. The apparatus according to claim 10, wherein said lock member is rotatably supported by said closure member, said apparatus further comprising an operating member that is movable in association with said lock member.

12. The apparatus according to claim 1, wherein said vehicle-compartment-side operating member and said trunk-room-side operating member are respectively connected to one of the first hook and the second hook, and wherein said lock member limits displacement of said one of the first hook and the second hook, to make it impossible to release engagement of the first hook with the second hook from the side of the vehicle compartment.

13. The apparatus according to claim 1, wherein said biasing member comprises a first spring provided between said first hook and said closure member, and a second spring provided between said second hook and said support member.

14. The apparatus according to claim 1, wherein the biasing member comprises a slider and a coil spring, wherein the slider is slidably attached to a mounting bracket so that the slider can abut to an upper end of the second hook, and wherein the coil spring is connected to the first hook and the slider.

15. The apparatus according to claim 1, wherein the biasing member comprises a coil spring, wherein one end of the coil spring is connected to the second hook and the other end abuts a lower end of the first hook.

* * * * *